(12) United States Patent
Nakahashi et al.

(10) Patent No.: US 8,815,129 B2
(45) Date of Patent: Aug. 26, 2014

(54) DEVICE AND METHOD FOR FORMING LENS

(75) Inventors: Takahiro Nakahashi, Osaka (JP); Hiroyuki Hanato, Osaka (JP); Kenji Hirano, Osaka (JP); Norimichi Shigemitsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 597 days.

(21) Appl. No.: 12/893,113

(22) Filed: Sep. 29, 2010

(65) Prior Publication Data
US 2011/0074055 A1 Mar. 31, 2011

(30) Foreign Application Priority Data

Sep. 30, 2009 (JP) ................................. 2009-227533

(51) Int. Cl.
*B29C 35/12* (2006.01)
*G02B 3/00* (2006.01)
*B29D 11/00* (2006.01)

(52) U.S. Cl.
CPC ........ *B29D 11/00009* (2013.01); *G02B 3/0031* (2013.01)
USPC .......... 264/1.32; 264/1.36; 264/496; 264/484

(58) Field of Classification Search
USPC ................. 264/496, 484, 1.32, 1.36
See application file for complete search history.

(56) References Cited

U.S. PATENT DOCUMENTS

| | | | | |
|---|---|---|---|---|
| 2004/0008334 A1* | 1/2004 | Sreenivasan et al. | ........... | 355/72 |
| 2005/0226955 A1* | 10/2005 | Yuasa et al. | ................... | 425/406 |
| 2006/0012889 A1 | 1/2006 | Kojima et al. | | |
| 2006/0261241 A1 | 11/2006 | Chen | | |
| 2006/0290017 A1* | 12/2006 | Yanagisawa | ................. | 264/1.27 |
| 2008/0217822 A1* | 9/2008 | Chou et al. | ..................... | 264/496 |
| 2008/0252988 A1* | 10/2008 | Tormen et al. | ................ | 359/652 |
| 2013/0136954 A1* | 5/2013 | Fujita et al. | ....................... | 429/7 |

FOREIGN PATENT DOCUMENTS

| | | |
|---|---|---|
| CN | 1865178 B | 6/2011 |
| JP | 62-203744 | 9/1987 |
| JP | 2000-263556 A | 9/2000 |
| JP | 2004-333833 | 11/2004 |
| JP | 2005-60657 | 3/2005 |
| JP | 2006-064950 | 3/2006 |
| JP | 2009-126036 | 6/2009 |

* cited by examiner

*Primary Examiner* — Yogendra Gupta
*Assistant Examiner* — Kimberly A Stewart
(74) *Attorney, Agent, or Firm* — Nixon & Vanderhye PC

(57) ABSTRACT

In order to realize a device and a method each capable of forming a lens with high accuracy and low costs, a lens forming device of the present invention includes a metal mold, an insulating substrate, a stage, a power source, a switch, and a UV radiating device. Dielectric resin is supplied onto the insulating substrate and a transfer surface of the metal mold is pressed to the dielectric resin so as to transfer a lens shape to the dielectric resin. At that time, the power source applies a voltage on the metal mold to generate an electric field between the metal mold and the insulating substrate so that an electrostatic attraction causes the dielectric resin to be attracted toward the transfer surface of the metal mold while the top of the dielectric resin has a sharp cuspate shape. Consequently, bubbles are less likely to be invade between the transfer surface and the dielectric resin, allowing transferring a highly accurate lens shape to the dielectric resin.

4 Claims, 13 Drawing Sheets

DEVICE AND METHOD FOR FORMING LENS

This Nonprovisional application claims priority under 35 U.S.C. §119(a) on Patent Application No. 2009-227533 filed in Japan on Sep. 30, 2009, the entire contents of which are hereby incorporated by reference.

TECHNICAL FIELD

The present invention relates to a device and a method for forming, with high accuracy and low cost, a lens having a complicated shape.

BACKGROUND ART

The most common technique for forming a lens has been a method using polishing as disclosed in patent Literature 1 for example. Patent Literature 1 discloses a method for designing in advance a polishing plate to have a shape opposite to that of a lens to be formed, pressing the polishing plate to a glass material, and polishing the glass material by the polishing plate while supplying abrasive particles between the polishing plate and the glass material.

Further, with the increasing need for higher performance of optical systems, the technique of forming a non-spherical lens as well as the technique of processing a lens with high accuracy is getting more important. However, the polishing method disclosed in Patent Literature 1 has difficulty in forming a non-spherical lens. Therefore, it is necessary to combine a plurality of lenses in order to correct various optical aberrations such as a spherical aberration, a coma aberration, and astigmatism. This raises a problem of high production cost.

In order to deal with this problem, Patent Literature 2 for example discloses a hybrid lens which is obtained by attaching a resin layer to a glass lens base material and which has a large difference between the minimum and the maximum thickness of the lens and a large area of a non-spherical surface. FIG. 16 is a cross sectional view illustrating a hybrid lens 200 described in Patent Literature 2. The hybrid lens 200 has a configuration in which a resin layer 203 whose outer shape is non-spherical is attached to one side or both sides of a spherical glass lens base material 202. The spherical glass lens base material 202 may be a convex lens or a concave lens. The maximum thickness Tmax of the resin layer 203 within an effective diameter of the lens ranges from 1 mm to 10 mm, and preferably from 2 mm to 8 mm. Thus, the hybrid lens 200 has the thick resin layer 203, has a large difference between the minimum and the maximum thickness of the lens, and has a large area of a non-spherical surface.

CITATION LIST

Patent Literatures

Patent Literature 1: Japanese Patent Application Publication Tokukaisho No. 62-203744 A (published on Sep. 8, 1987)
Patent Literature 2: Japanese Patent Application Publication Tokukai No. 2005-60657 A (published on Mar. 10, 2005)

SUMMARY OF INVENTION

Technical Problem

However, the technique described in Patent Literature 2 requires the glass lens base material 202 and a resin material for the resin layer 203 in order to increase the area of a non-spherical surface of the hybrid lens 200. This increases the number of lenses required for correction of aberration, resulting in high cost. Further, the technique described in Patent Literature 2 has difficulty in producing a lens having a complicated shape, such as a non-spherical lens having a large area of a non-spherical surface.

The present invention was made in view of the foregoing problem. An object of the present invention is to provide a device and a method for forming, with high accuracy and low cost, a lens having a complicated shape.

Solution to Problem

In order to solve the problem, a lens forming device of the present invention includes: a substrate; supply means for supplying a dielectric body onto the substrate; a mold having a transfer surface for transferring a lens shape to the dielectric body; transfer means for transferring the lens shape to the dielectric body by pressing the transfer surface to the dielectric body; and curing means for curing the dielectric body to which the transfer surface is pressed, so as to form a lens, the lens forming device further including electric field generating means for generating an electric field between the mold and the substrate.

With the arrangement, the supply means supplies the dielectric body onto the substrate and the transfer means presses the mold, having the transfer surface for transferring a lens shape, to the dielectric body thus supplied, so that the lens shape is transferred to the dielectric body. Further, the curing means cures the dielectric body, and thus a lens is formed. At that time, the electric field generating means generates an electric field between the mold and the substrate, so that an electrostatic attraction causes the dielectric body to be attracted to the transfer surface. The dielectric body thus attracted is shaped such that its top facing the transfer surface has a sharp cuspate shape, so that bubbles are less likely to invade between the transfer surface and the dielectric body when the transfer surface is pressed to the dielectric body. This allows transferring a highly accurate lens shape to the dielectric body. Further, an electrostatic attraction generated by generation of an electric field has largest intensity at the center of the transfer surface, and accordingly the dielectric body is attracted toward the center of the transfer surface while the transfer surface is pressed to the dielectric body. Therefore, no dielectric body is attached to sides of the mold. This makes it unnecessary to carry out a process for removing a convex portion around the lens which portion would be formed when curing the dielectric body some of which attached to the sides of the mold. Consequently, it is possible to realize a lens forming device capable of forming, with high accuracy and low cost, a lens having a complicated shape.

In order to solve the problem, a method of the present invention for forming a lens includes the steps of: (i) supplying a dielectric body onto a substrate; (ii) transferring a lens shape to the dielectric body by pressing a transfer surface of a mold to the dielectric body, the transfer surface being for transferring the lens shape to the dielectric body; and (iii) curing the dielectric body to which the transfer surface is pressed, so as to form a lens, an electric field being generated between the mold and the substrate when the transfer surface is pressed to the dielectric body in the step (ii).

With the arrangement, the dielectric body is supplied onto the substrate in the step (i), and the mold having the transfer surface for transferring a lens shape is pressed to the dielectric body in the step (ii), so that the lens shape is transferred to the dielectric body. Further, the dielectric body is cured in the step (iii), and thus a lens is formed. In the above method, an electric field is generated between the mold and the substrate. While an electric field is generated, an electrostatic attraction causes the dielectric body to be attracted to the transfer surface. The dielectric body thus attracted is shaped such that its top facing the transfer surface has a sharp cuspate shape, so that bubbles are less likely to invade between the transfer surface and the dielectric body when the transfer surface is pressed to the dielectric body. This allows transferring a highly accurate lens shape to the dielectric body. Consequently, it is possible to realize a lens forming method capable of forming, with high accuracy and low cost, a lens having a complicated shape.

Advantageous Effects of Invention

As described above, the lens forming device of the present invention includes: a substrate; supply means for supplying a dielectric body onto the substrate; a mold having a transfer surface for transferring a lens shape to the dielectric body; transfer means for transferring the lens shape to the dielectric body by pressing the transfer surface to the dielectric body; and curing means for curing the dielectric body to which the transfer surface is pressed, so as to form a lens, the lens forming device further including electric field generating means for generating an electric field between the mold and the substrate. Further, a method of the present invention for forming a lens includes the steps of: (i) supplying a dielectric body onto a substrate; (ii) transferring a lens shape to the dielectric body by pressing a transfer surface of a mold to the dielectric body, the transfer surface being for transferring the lens shape to the dielectric body; and (iii) curing the dielectric body to which the transfer surface is pressed, so as to form a lens, an electric field being generated between the mold and the substrate when the transfer surface is pressed to the dielectric body in the step (ii). Therefore, the present invention provides a device and a method each capable of forming, with high accuracy and low cost, a lens having a complicated shape.

DESCRIPTION OF EMBODIMENTS

One embodiment of the present invention is explained below with reference to FIGS. 1-14.

[Configuration of Lens Forming Device]

Figure 1:
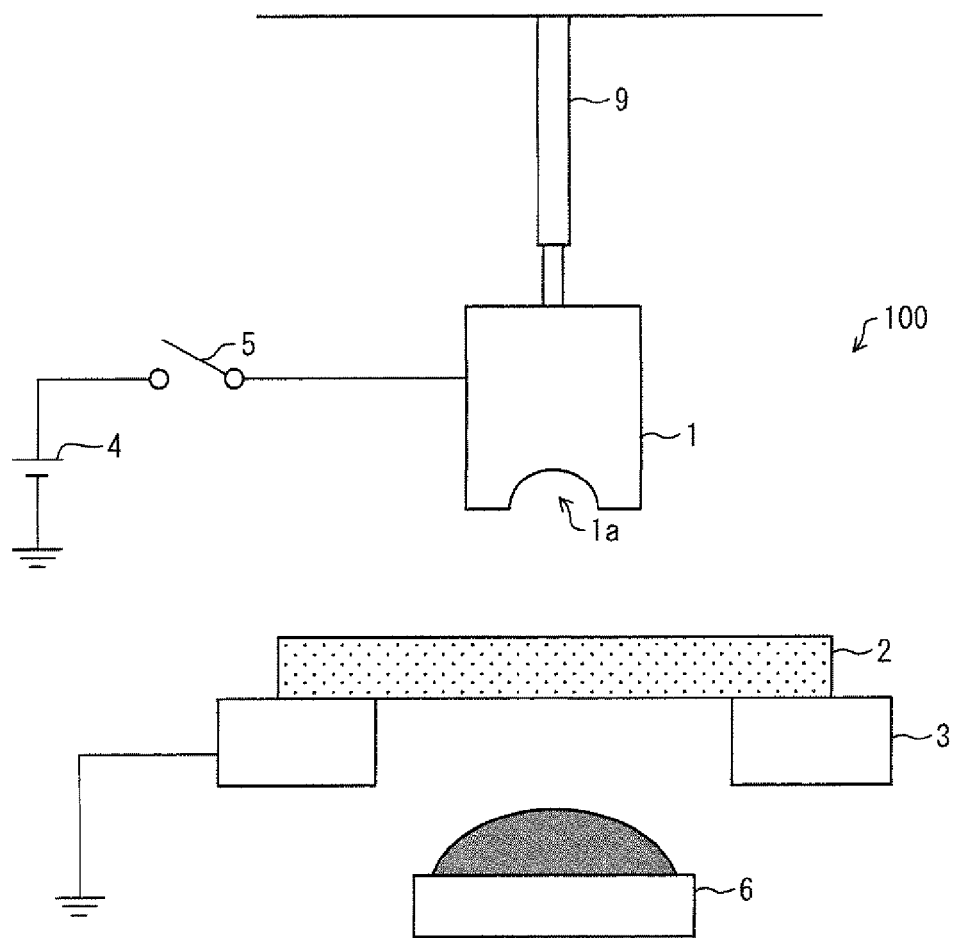
FIG. 1 is a cross sectional view illustrating a configuration of a lens forming device in accordance with one embodiment of the present invention.

FIG. 1 is a cross sectional view illustrating a configuration of a lens forming device 100 in accordance with the present embodiment. The lens forming device 100 includes a metal mold 1, an insulating substrate 2, a stage 3, a power source 4, a switch 5, a UV radiating device 6, and a supporter 9. The lens forming device 100 forms a lens from dielectric resin supplied onto the insulating substrate 2.

The metal mold 1 corresponds to a mold recited in claims. The metal mold 1 is provided above the insulating substrate 2, and has a transfer surface 1a for transferring a lens shape to the dielectric resin. The transfer surface 1a faces the insulating substrate 2, and has a non-spherical concave portion at its center. The insulating substrate 2 is placed on the stage 3. The stage 3 has a circular hole at its center, and the UV radiating device 6 is provided below the hole.

The metal mold 1 is connected with the power source 4 via the switch 5. In the present embodiment, the power source 4 is a direct current power source, and can apply a direct current voltage to the metal mold 1 when the switch 5 is made on. On the other hand, the stage 3 is grounded.

The supporter 9 is a movable member capable of moving the metal mold 1 upward and downward in the drawing. The supporter 9 corresponds to transfer means recited in claims.

[Steps of Forming Lens]

Next, with reference to FIGS. 2-6, an explanation is made as to steps carried out by the lens forming device 100 for forming a lens.

Figure 2:
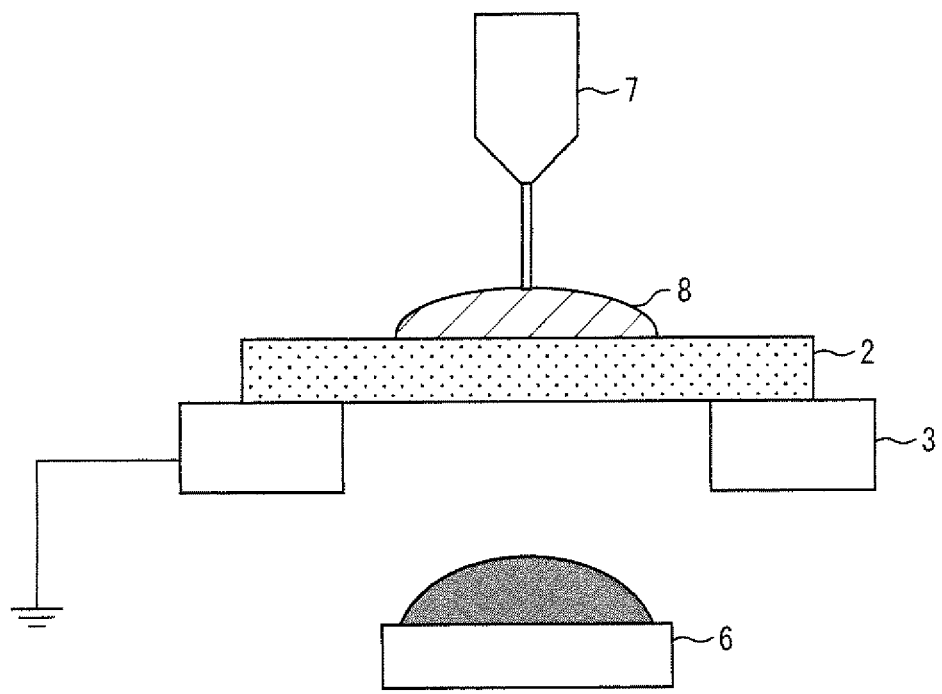
FIG. 2 is a cross sectional view illustrating a state where dielectric resin is supplied onto an insulating substrate in the lens forming device.

Initially, as illustrated in FIG. 2, the dielectric resin 8 is supplied onto the insulating substrate 2 by using a dispenser 7. The dielectric resin 8 is photo-curing resin which is cured in response to radiation of UV. This step corresponds to the step of supplying recited in claims, and the dispenser 7 corresponds to supply means recited in claims.

Figure 3:
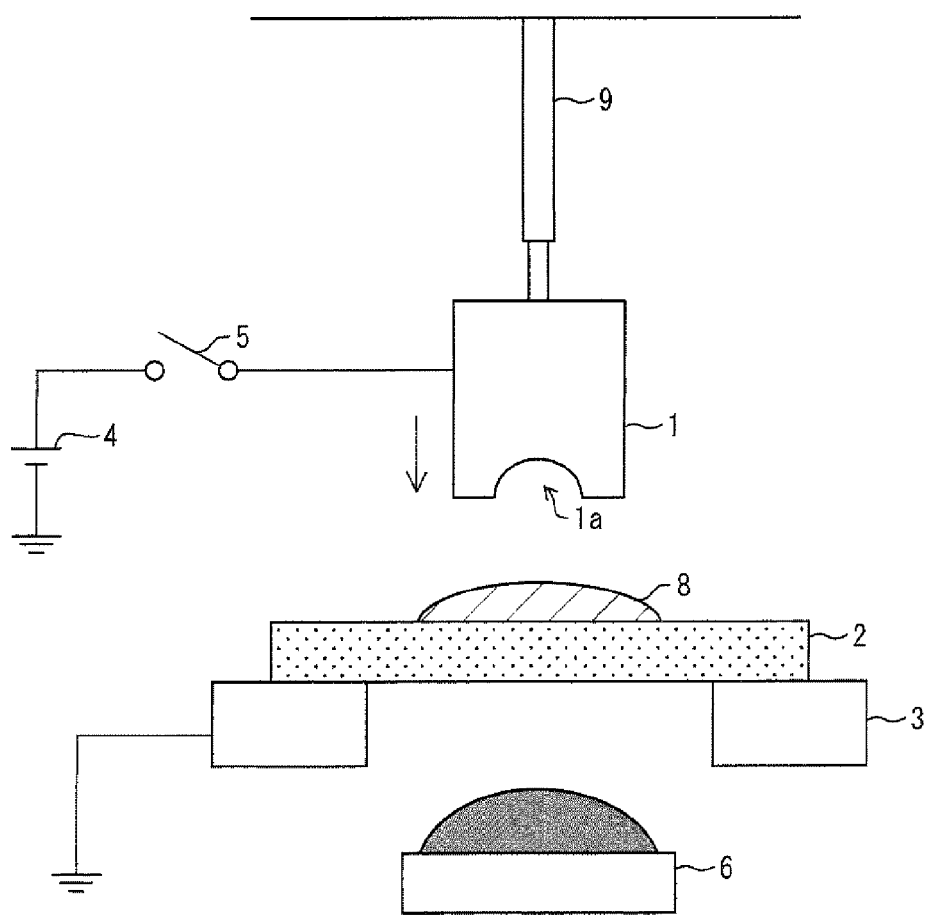
FIG. 3 is a cross sectional view illustrating a state where the dielectric resin is positioned to be between the insulating substrate and a transfer surface of a metal mold in the lens forming device.

Next, as illustrated in FIG. 3, the dielectric resin 8 is positioned to be between the insulating substrate 2 and the transfer surface 1a of the metal mold 1. While maintaining this positional relationship, the metal mold 1 is moved downward by the supporter 9.

Figure 4:
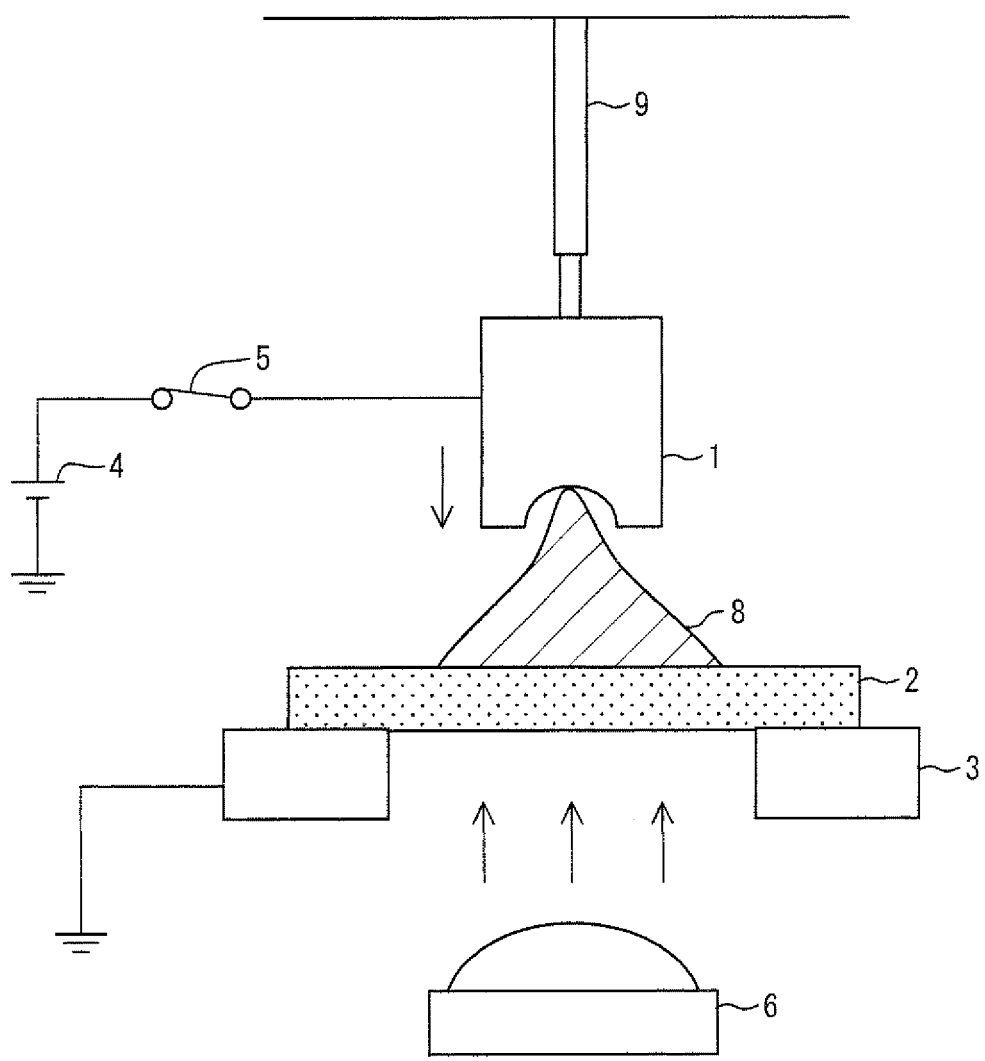
FIG. 4 is a cross sectional view illustrating a state where an electric field is generated between the metal mold and the insulating substrate in the lens forming device.

Next, as illustrated in FIG. 4, the switch 5 is made on and a direct current voltage is applied to the metal mold 1. At that time, as mentioned later, an electric field is generated between the metal mold 1 and the insulating substrate 2, and the dielectric resin 8 is attracted toward the transfer surface 1a of the metal mold 1 by an electrostatic attraction. Further, the UV radiating device 6 radiates UV to the dielectric resin 8. The power source 4 and the UV radiating device 6 correspond to electric field generating means and curing means, respectively.

Figure 5:
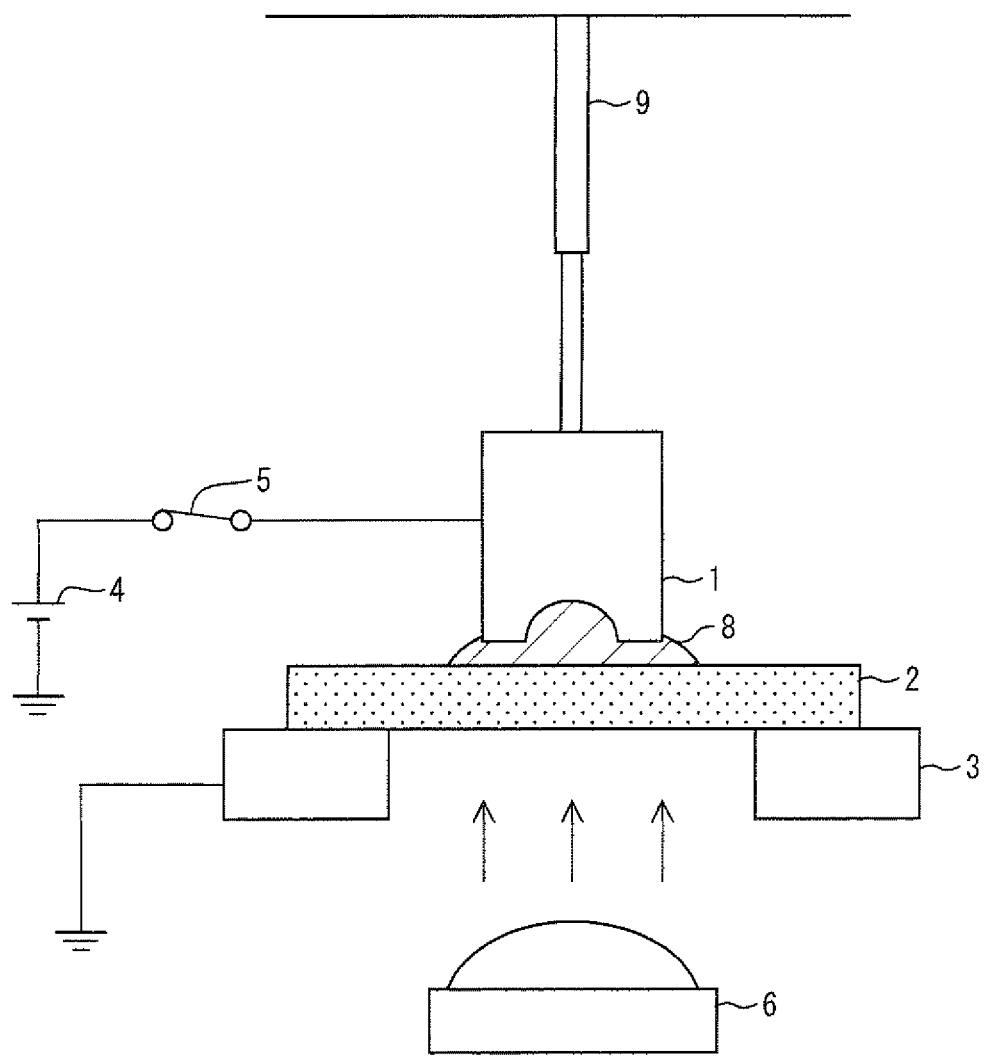
FIG. 5 is a cross sectional view illustrating a state where the transfer surface of the metal mold is pressed to the dielectric resin in the lens forming device.

When the metal mold 1 is moved further downward by the supporter 9, the transfer surface 1a of the metal mold 1 is pressed to the dielectric resin 8 as illustrated in FIG. 5, and the dielectric resin 8 closely contacts the transfer surface 1a. Consequently, a lens shape is transferred to the dielectric resin 8. While keeping this positional relationship, the UV radiating device 6 radiates UV to the dielectric resin 8, thereby curing the dielectric resin 8.

Figure 6:
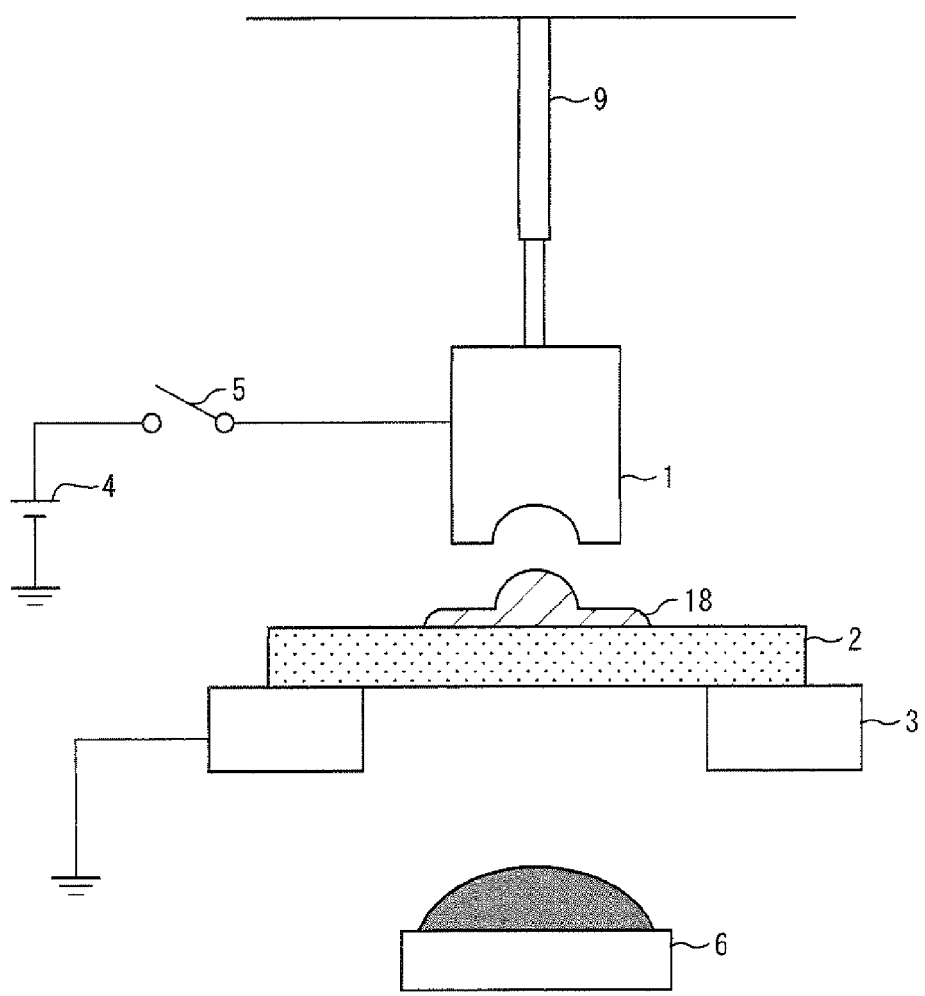
FIG. 6 is a cross sectional view illustrating a state where a single-sided lens is formed in the lens forming device.

After the dielectric resin 8 has been sufficiently cured, the switch 5 is made off and the metal mold 1 is moved upward by the supporter 9 as illustrated in FIG. 6. Thus, a single-sided lens 18 having a non-spherical shape is formed.

In the present embodiment, when the metal mold 1 is caused to be closer to the dielectric resin 8, an electric field is generated between the metal mold 1 and the insulating substrate 2. At that time, the upper end of the dielectric resin 8 is sharp cuspate, which allows a first contact area between the dielectric resin 8 and the transfer surface 1a of the metal mold 1 to be very small. Thereafter, the contact area between the dielectric resin 8 and the transfer surface 1a becomes broader gradually from the first contact area to its surroundings. Consequently, bubbles are less likely to invade between the transfer surface 1a and the dielectric resin 8 when the transfer surface 1a is pressed to the dielectric resin 8. Therefore, the present embodiment allows transferring a more accurate lens shape to the dielectric resin 8 compared with a case of transferring a lens shape to the dielectric resin 8 without generating an electric field between the metal mold 1 and the insulating substrate 2.

As optical systems have higher performance, the shapes of lenses are required to have accuracy on the order of nanometers. However, when forming a lens having a large area of a non-spherical surface or a lens having a complicated edge shape, pressing the transfer surface 1a to the dielectric resin 8 without generating an electric field between the metal mold 1 and the insulating substrate 2 makes a large number of bubbles on the order of micrometers between the transfer surface 1a and the dielectric resin 8. In contrast thereto, in the present embodiment, almost no bubbles invade between the transfer surface 1a and the dielectric resin 8. This allows forming a lens usable for optical systems with higher performance.

Further, in a case where the thickness of a lens to be formed or the sag amount of a lens to be formed is large, when no electric field is generated between the metal mold 1 and the insulating substrate 2, the dielectric resin 8 is less likely to follow the transfer surface 1a because of gravity and surface tension, and consequently it is difficult to transfer the shape of the transfer surface 1a to the dielectric resin 8. In contrast thereto, in the present embodiment, an electric field is generated between the metal mold 1 and the insulating substrate 2, thereby generating an electrostatic attraction larger than the gravity applied on the dielectric resin 8 and the surface tension of the dielectric resin 8. Consequently, the dielectric resin 8 is attracted toward the transfer surface 1a, allowing the shape of the transfer surface 1a to be transferred to the dielectric resin 8 with high accuracy.

Timing at which an electric field is generated in the present embodiment is such that an electric field is generated from a time when the metal mold 1 starts to be moved downward to a time when curing of the dielectric resin 8 is completed, as illustrated in FIGS. 4 and 5. However, the timing at which an electric field is generated is not limited to this. For example, an electric field may be generated only from a time when the dielectric resin 8 touches the transfer surface 1a to a time when the dielectric resin 8 closely contacts the transfer surface 1a. It should be noted that generating an electric field also in the step of UV radiation as in the present embodiment allows the dielectric resin 8 to contact the transfer surface 1a more closely, allowing formation of a lens with further higher accuracy.

Further, timing at which UV is radiated may be such that UV is radiated after the dielectric resin 8 has completely and closely contacted the transfer surface 1a.

[Operation and Effect of Electric Field Formation]

Next, the following explains a mechanism in which the shape of the dielectric resin 8 gets cuspated when an electric field is generated between the metal mold 1 and the insulating substrate 2.

Figure 7:
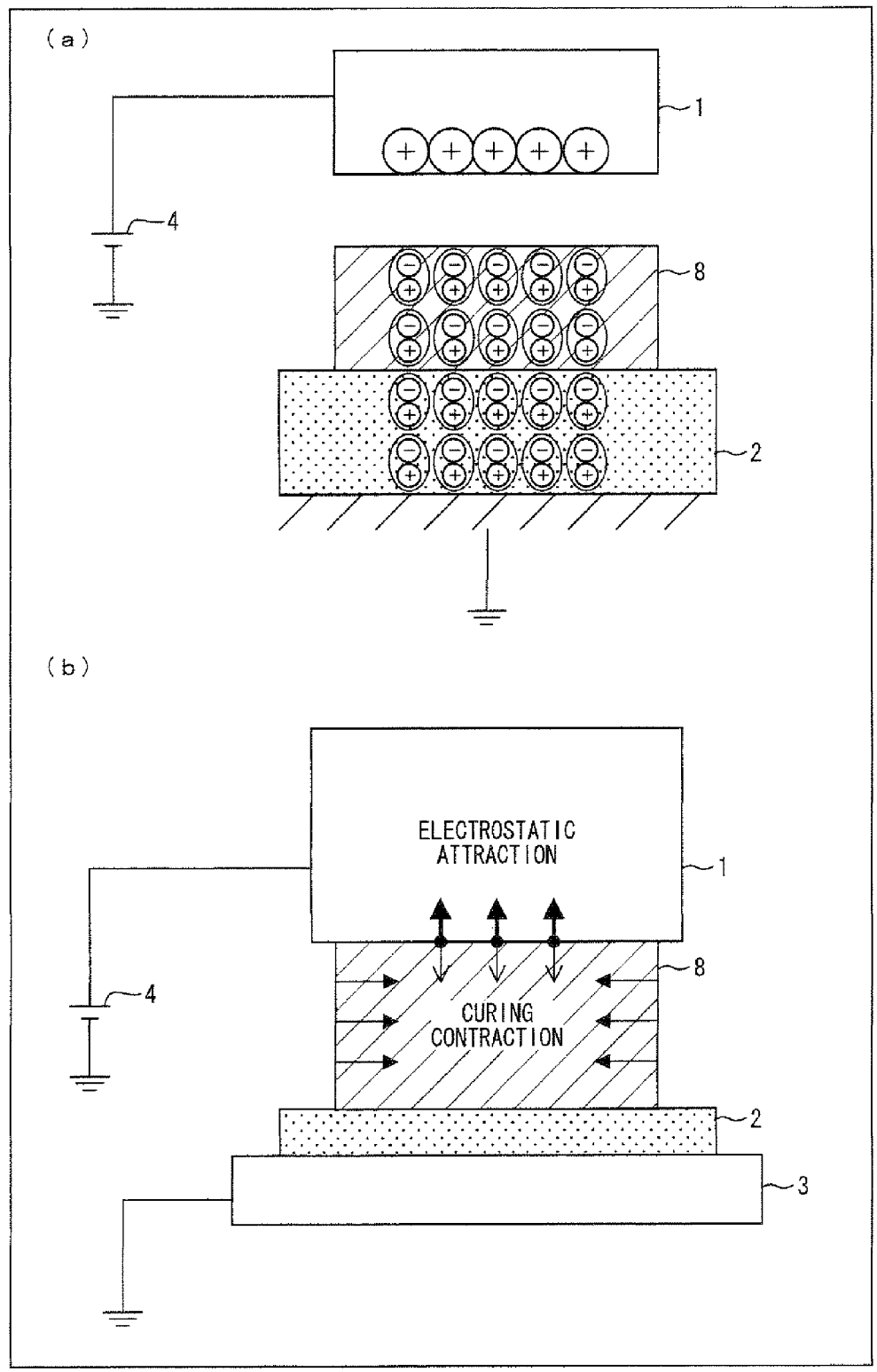
FIG. 7(a) is a view illustrating a state where the metal mold, the dielectric resin, and the insulating substrate are electrified when an electric field is generated between the metal mold and the insulating substrate.
FIG. 7(b) is a view illustrating a force applied on the metal mold, the dielectric resin, and the insulating substrate when an electric field is generated between the metal mold and the insulating substrate.

FIG. 7(a) is a view illustrating a state where the metal mold 1, the dielectric resin 8, and the insulating substrate 2 are electrified when an electric field is generated between the metal mold 1 and the insulating substrate 2. FIG. 7(b) is a view illustrating a force applied on the metal mold 1, the dielectric resin 8, and the insulating substrate 2 when an electric field is generated between the metal mold 1 and the insulating substrate 2. For simplification, the dielectric resin 8 is drawn in a rectangular shape in FIG. 7.

As illustrated in FIG. 7(a), a direct current voltage is applied on the metal mold 1 by the power source 4, and therefore the metal mold 1 is positively electrified. Since the dielectric resin 8 is an insulating material, dielectric polarization causes a portion of the dielectric resin 8 which portion faces the metal mold 1 (i.e. upper portion of the dielectric resin 8) to be negatively electrified and causes a portion of the dielectric resin 8 which portion is opposite to the portion facing the metal mold 1 (i.e. lower portion of the dielectric resin 8) to be positively electrified. Similarly, a surface of the insulating substrate 2 which surface contacts the dielectric resin 8 is negatively electrified, and a surface of the insulating substrate 2 which surface is opposite to the surface contacting the dielectric resin 8 is positively electrified. Consequently, the metal mold 1 serves as an anode and the insulating substrate 2 serves as a cathode.

As described above, since the metal mold 1 and the upper portion of the dielectric resin 8 are electrified with opposite polarities, an electrostatic attraction which attracts the dielectric resin 8 toward the metal mold 1 is generated as indicated by upward arrows in FIG. 7(b). When UV is radiated to the dielectric resin 8, contractive forces indicated by downward arrows and lateral arrows are generated in the dielectric resin 8 as a result of curing contraction. However, these contractive forces are smaller than the electrostatic attraction, and consequently the dielectric resin 8 is attracted toward the metal mold 1.

Intensity of an electric field to be generated may be appropriately set in accordance with permittivity of the dielectric resin 8 so that an electrostatic attraction generated by the electric field is larger than the sum of gravity and contractive forces of the dielectric resin 8.

Figure 8:
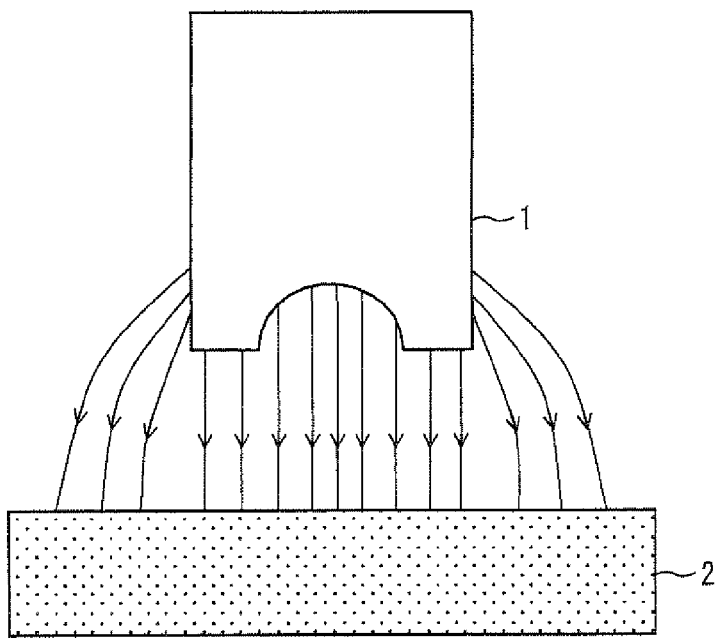
FIG. 8 is a view illustrating electric field lines when an electric field is generated between the metal mold and the insulating substrate.

FIG. 8 is a view illustrating electric field lines when an electric field is generated between the metal mold 1 and the insulating substrate 2. The electric field lines are strongest at the center of the transfer surface 1a of the metal mold 1 and are smaller as the electric field lines are farer from the center. Consequently, the dielectric resin 8 has a shape tapered toward a concave portion of the transfer surface 1a.

Figure 9:
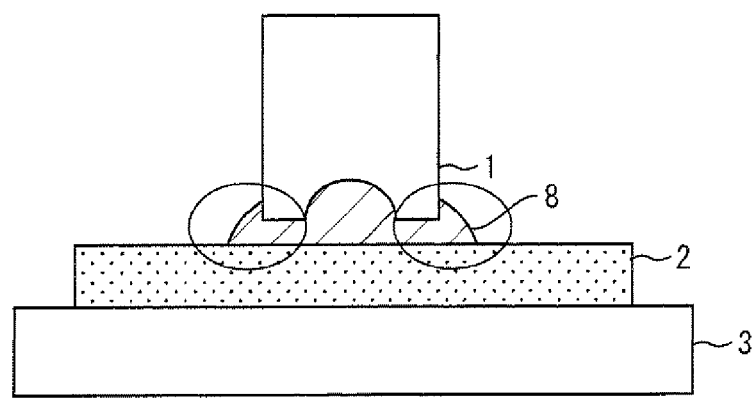
FIG. 9 is a cross sectional view illustrating a state where some of the dielectric resin is attached to sides of the metal mold.
Figure 10:
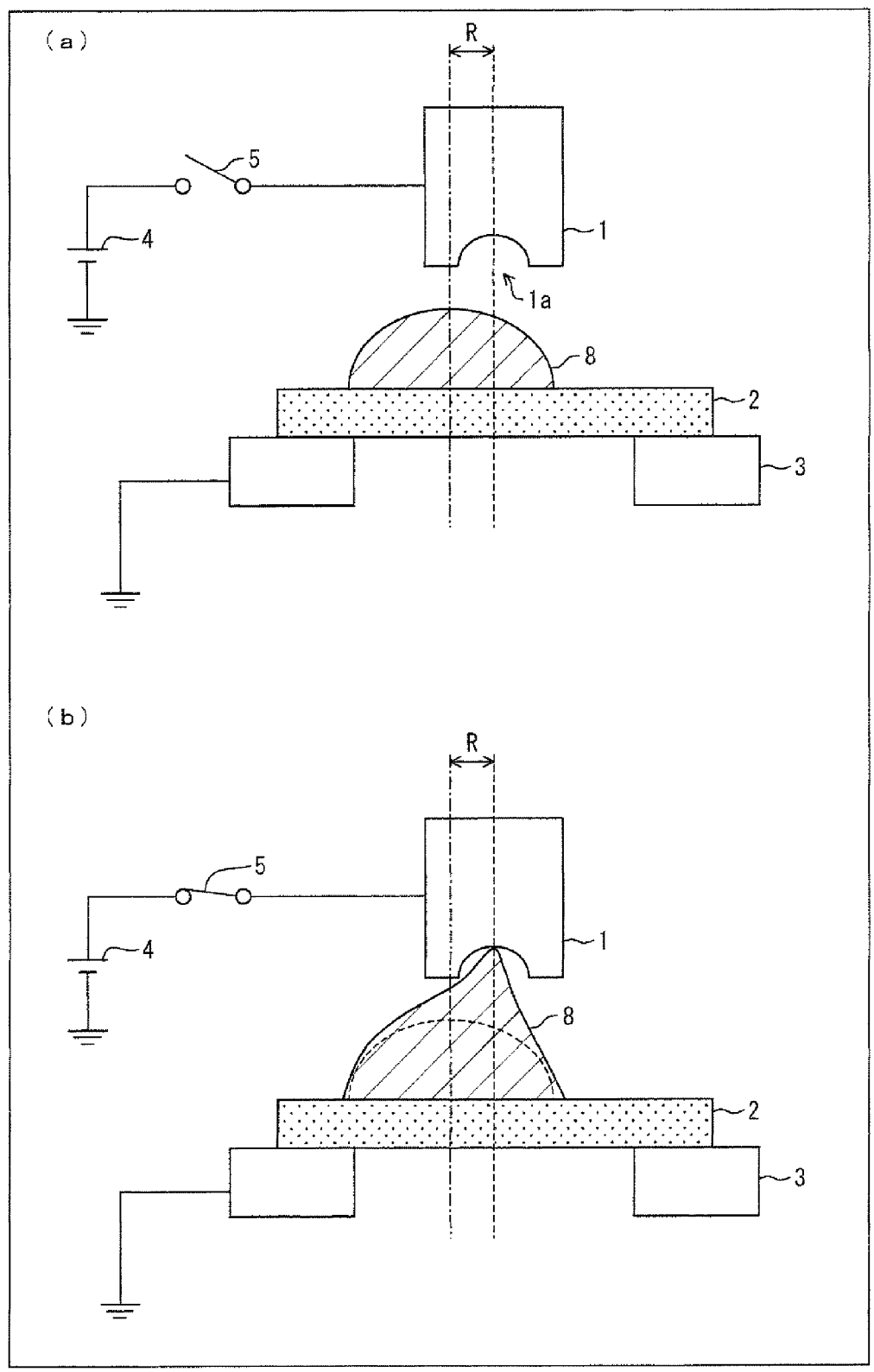
FIG. 10(a) is a cross sectional view illustrating a state where the center of the transfer surface of the metal mold does not correspond to the center of the dielectric resin.
FIG. 10(b) is a cross sectional view illustrating a state where the dielectric resin is attracted toward the center of the transfer surface by generation of an electric field between the metal mold and the insulating substrate.

In a case where the transfer surface 1a is pressed to the dielectric resin 8 without generating an electric field between the metal mold 1 and the insulating substrate 2, there is a possibility that some of the dielectric resin 8 is attached to sides of the metal mold 1 as indicated by circles in FIG. 9. Curing the dielectric resin 8 under such condition forms a convex portion around the lens. Accordingly, it is necessary to remove the convex portion in a later step.

As illustrated in FIG. 8, electric field lines are longer at sides of the metal mold 1. Consequently, an electrostatic attraction at the sides of the metal mold 1 is weaker than an electrostatic attraction at the transfer surface 1a of the metal mold 1. As a result, when the transfer surface 1a is pressed to the dielectric resin 8, the dielectric resin 8 is attracted toward the center of the transfer surface 1a, and is not attached to the sides of the metal mold 1. Therefore, it is unnecessary to remove a convex portion around the lens, enabling to save a material of the dielectric resin 8 by approximately 30%, compared with a case where the dielectric resin 8 is attached to the sides of the metal mold 1. This broadens the margin of the material, allowing reduction of production cost.

In the lens forming device 100, even when the dielectric resin 8 is positioned a little out of a place where the dielectric resin 8 is to be supplied, it is possible to transfer a lens shape to the dielectric resin 8 with high accuracy. FIG. 10(a) is a cross sectional view illustrating a state where the center of the transfer surface 1a of the metal mold 1 is away from the center of the dielectric resin 8 by a distance R. Even under such condition, the dielectric resin 8 is attracted toward the center of the transfer surface 1a when the switch 5 is made on and an electric field is generated between the metal mold 1 and the insulating surface 1a. This allows the dielectric resin 8 to closely contact the transfer surface 1a. As described above, in the present embodiment, even when the dielectric resin 8 is positioned out of a place where the dielectric resin 8 is to be supplied, self-alignment of the dielectric resin 8 is possible. Specifically, as long as the distance R between the center of the transfer surface 1a of the metal mold 1 and the center of the dielectric resin 8 is approximately ⅓ or less of the diameter of the dielectric resin 8, it is possible to cause the dielectric resin 8 to closely contact the transfer surface 1a.

[Modification Examples of Lens Forming Device]

Next, the following explains modification examples of the present embodiment with reference to FIGS. 11-14.

Figure 11:
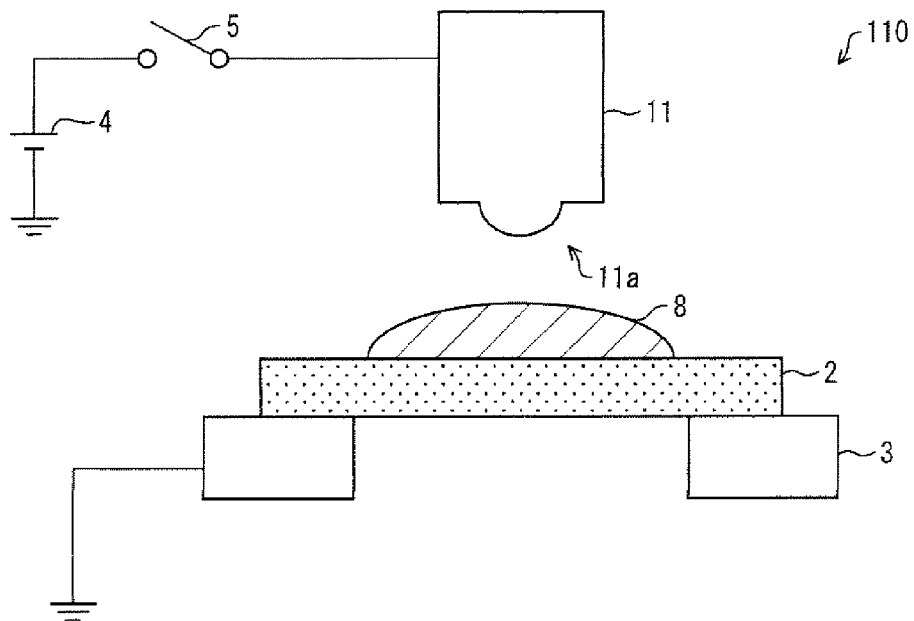
FIG. 11 is a cross sectional view illustrating a configuration of a lens forming device in accordance with a modification example of the embodiment of the present invention.

FIG. 11 is a cross sectional view illustrating a configuration of a lens forming device 110 in accordance with a modification example of the present embodiment. The lens forming device 110 is obtained by modifying the lens forming device 100 in FIG. 1 to replace the metal mold 1 with a metal mold 11. The metal mold 11 has a convex portion on its transfer surface 11a. Consequently, a concave shape is transferred to the dielectric resin 8.

Figure 12:
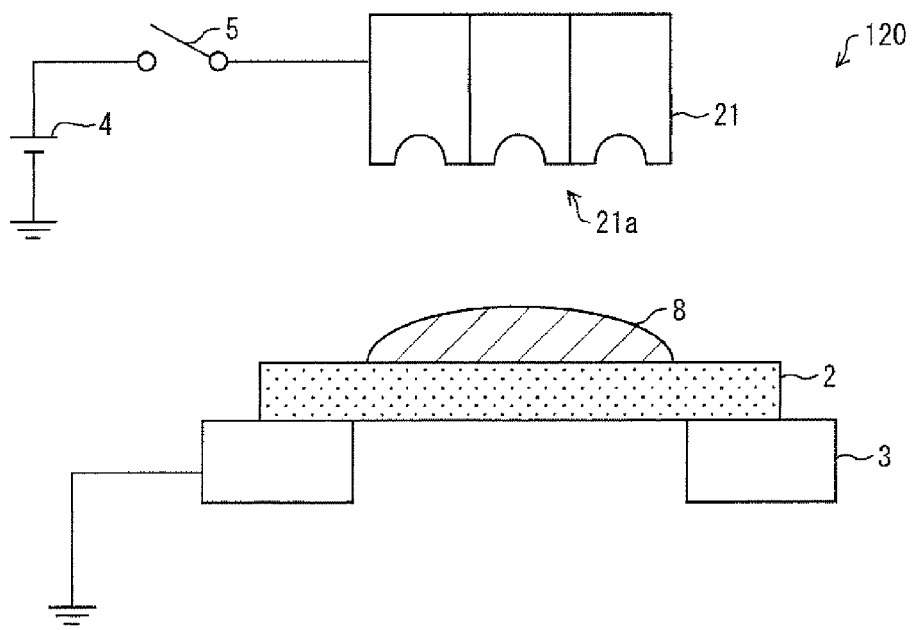
FIG. 12 is a cross sectional view illustrating a configuration of a lens forming device in accordance with another modification example of the embodiment of the present invention.

FIG. 12 is a cross sectional view illustrating a configuration of a lens forming device 120 in accordance with another modification example of the present embodiment. The lens forming device 120 is obtained by modifying the lens forming device 100 in FIG. 1 to replace the metal mold 1 with a metal mold 21. The metal mold 21 has a plurality of concave portions positioned in array on its transfer surface 21a. This allows forming a lens with a plurality of convex surfaces.

Figure 13:
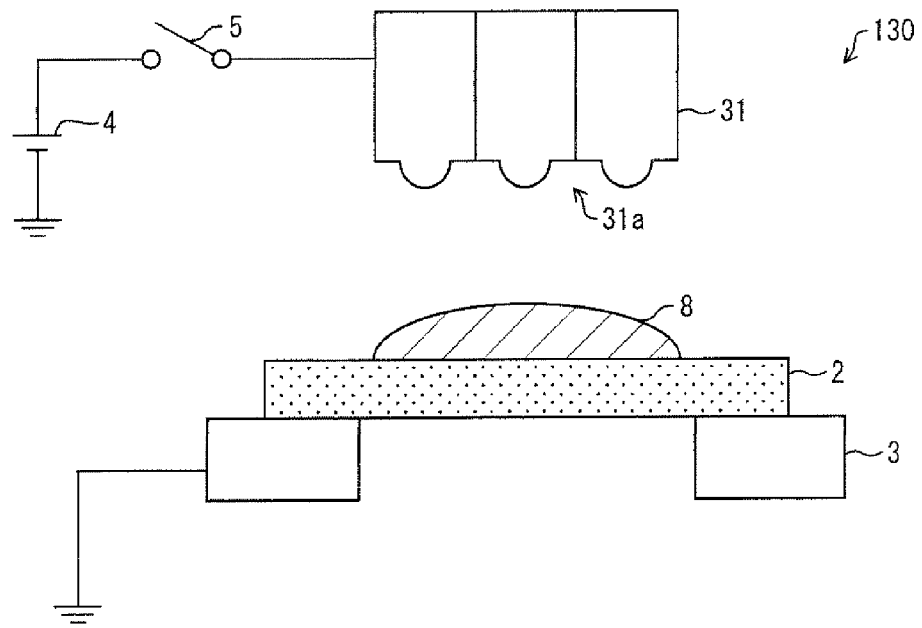
FIG. 13 is a cross sectional view illustrating a configuration of a lens forming device in accordance with still another modification example of the embodiment of the present invention.

FIG. 13 is a cross sectional view illustrating a configuration of a lens forming device 130 in accordance with still another modification example of the present embodiment. The lens forming device 130 is obtained by modifying the lens forming device 100 in FIG. 1 to replace the metal mold 1 with a metal mold 31. The metal mold 31 has a plurality of convex portions positioned in array on its transfer surface 31a. This allows forming a lens with a plurality of concave surfaces.

Figure 14:
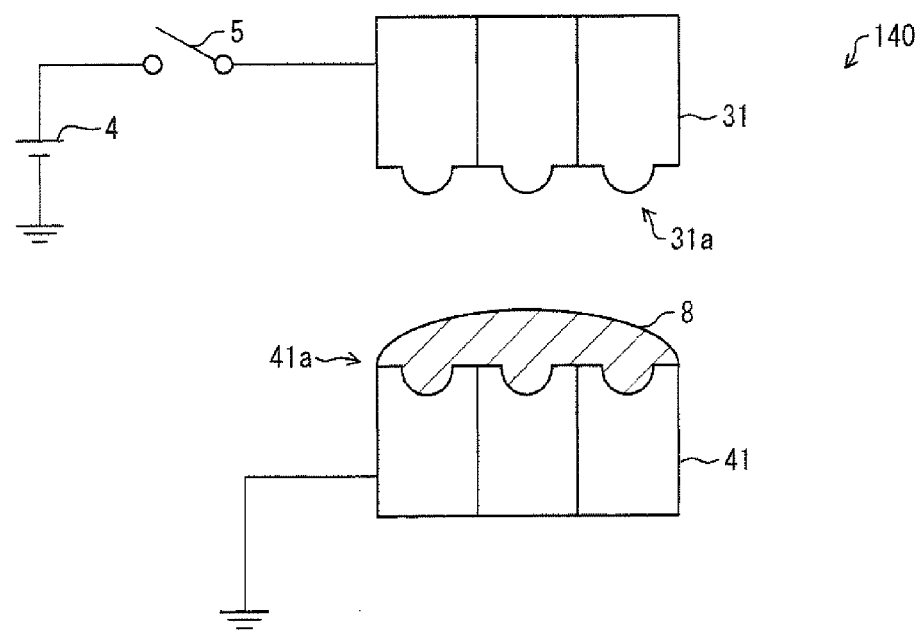
FIG. 14 is a cross sectional view illustrating a configuration of a lens forming device in accordance with yet another modification example of the embodiment of the present invention.

FIG. 14 is a cross sectional view illustrating a configuration of a lens forming device 140 in accordance with yet another modification example of the present embodiment. The lens forming device 140 is obtained by modifying the lens forming device 130 in FIG. 13 to replace the insulating substrate 2 and the stage 3 with a metal mold 41 which is grounded. The metal mold 31 and the metal mold 41 correspond to a second mold and a first mold, respectively, in claims.

In the lens forming device 140, the dielectric resin 8 is supplied onto a transfer surface 41a of the metal mold 41. Thereafter, the transfer surface 41a of the metal mold 41 and the transfer surface 31a of the metal mold 31 are caused to face each other, the transfer surface 31a of the metal mold 31 is pressed to the dielectric resin 8, and UV is radiated to the dielectric resin 8. At that time, the switch is made on so that an electric field is generated between the metal mold 31 and the metal mold 41. This causes the dielectric resin 8 to closely contact the transfer surface 31a, thereby allowing formation of a two-sided lens with a highly accurate lens shape.

EXAMPLE

In order to confirm that the lens forming device of the present invention can form a lens with a highly accurate lens shape, a test was made by using a trial model of the lens forming device. Insulating substrates used in the test were quartz glass substrates, and a direct current power source of 6 kv was used as electric field generating means for generating an electric field between a metal mold and a quartz glass substrate.

FIGS. 15(a) to 15(e) are photographs showing steps of forming a lens in accordance with the present example.

Figure 15:
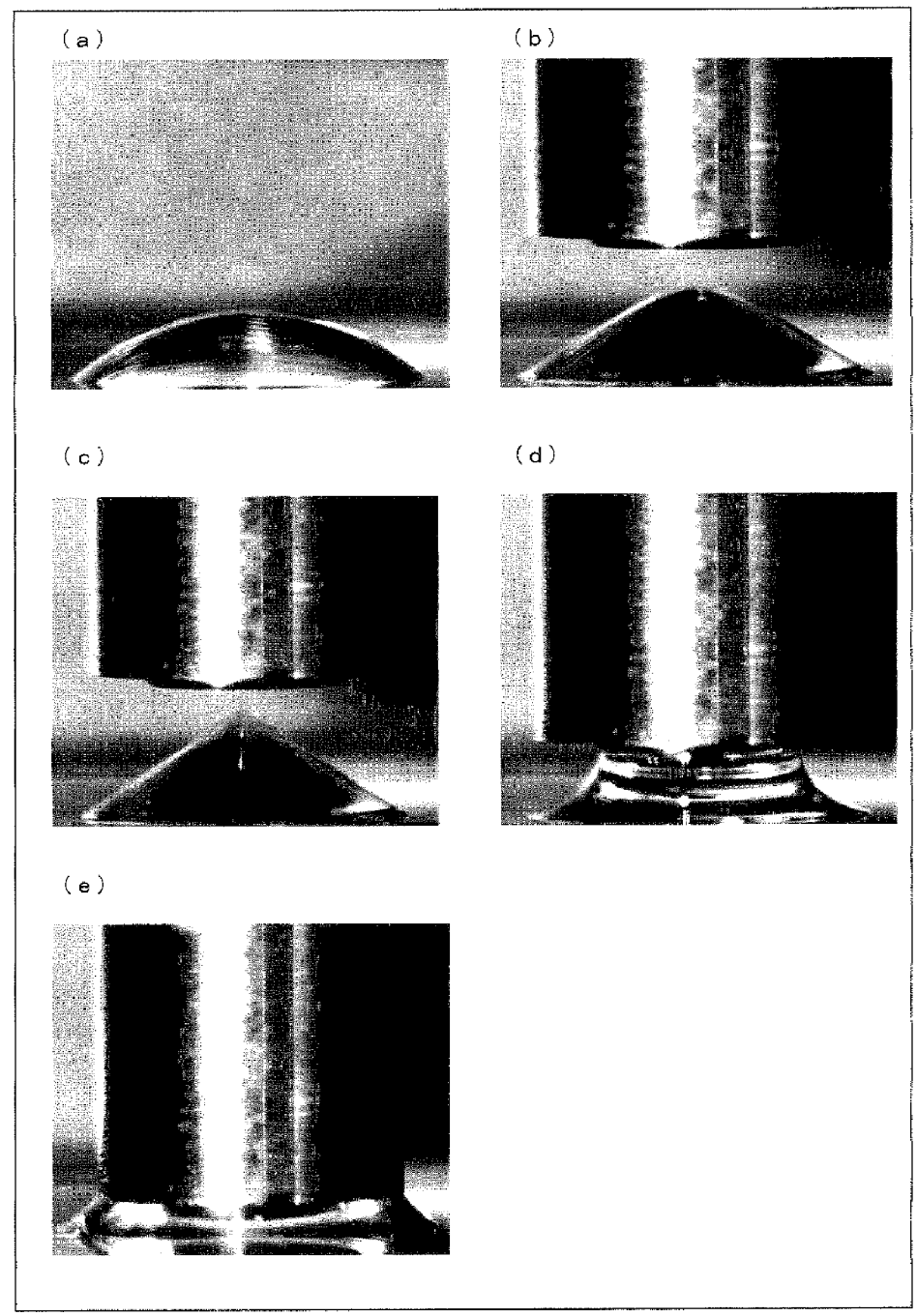
FIG. 15(a) is a photograph showing a step of forming a lens in an Example of the present invention.
FIG. 15(b) is a photograph showing a step of forming a lens in the Example of the present invention.
FIG. 15(c) is a photograph showing a step of forming a lens in the Example of the present invention.
FIG. 15(d) is a photograph showing a step of forming a lens in the Example of the present invention.
FIG. 15(e) is a photograph showing a step of forming a lens in the Example of the present invention.
Figure 16:
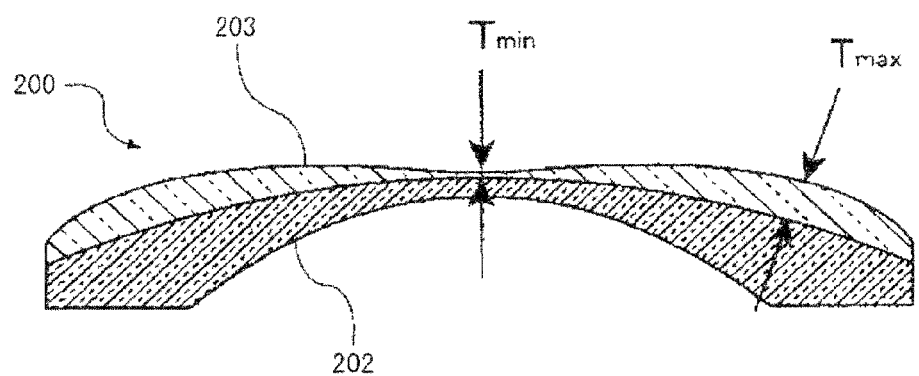
FIG. 16 is a cross sectional view illustrating a conventional hybrid lens.

As shown in FIG. 15(a), photo-curing resin which was a dielectric body was supplied onto a quartz glass substrate. Thereafter, as shown in FIG. 15(b), a transfer surface of a mold was caused to face the photo-curing resin, and the metal mold was moved downward and at the same time a direct current voltage of 6 kv was applied onto the metal mold. This generated an electric field between the quartz glass substrate and the metal mold, so that the photo-curing resin was attracted toward the center of the transfer surface.

At that time, it was confirmed that the upper end of the photo-curing resin had a sharp cuspate shape as shown in FIG. 15(c). Subsequently, a contact area between the photo-curing resin and the transfer surface broadened from the center of the transfer surface toward its surroundings, as shown in FIG. 15(d). Consequently, the photo-curing resin closely contacts the whole of the transfer surface, as shown in FIG. 15(e). It can be observed from FIG. 15(e) that no photo-curing resin was attached to sides of the metal mold.

Summary of Embodiments

In the above embodiments, an explanation was made as to a case where a voltage is applied on a metal mold and an insulating substrate is grounded so as to generate an electric field between the metal mold and the insulating substrate. However, the above embodiments are not limited to this case. For example, the present embodiments may be arranged such that a metal mold is grounded and a voltage is applied on an insulating substrate. Further, the lens forming device 140 in FIG. 14 may be arranged such that the metal mold 31 is grounded and a voltage is applied on the metal mold 41.

In the above embodiments, a direct current voltage is applied across the metal mold and the insulating substrate so as to generate an electric field between the metal mold and the insulating substrate. Alternatively, the above embodiments may be arranged such that an alternating current voltage is applied across the metal mold and the insulating substrate so as to generate an electric field between the metal mold and the insulating substrate.

In the above embodiments, a metal mold is used as a mold for transferring a lens shape to the dielectric resin. However, the mold is not limited to the metal mold as long as the mold serves as an electrode for generating an electric field.

In the above embodiments, the dielectric resin is cured by radiating UV to the dielectric resin. However, the above embodiments are not limited to this. For example, the above embodiments may be arranged such that dielectric resin is heated so as to be cured or such that a dielectric glass is cooled so as to be solid.

In the above embodiments, an explanation was made as to a case where the dielectric body is photo-curing resin. However, the above embodiments are not limited to this. For example, molten glass may be used as the dielectric body. In this case, generating an electric field under high temperature atmosphere allows the molten glass to closely contact a transfer surface of a metal mold. Thereafter, cooling and hardening the molten glass allows formation of a lens.

The present invention is not limited to the description of the embodiments above, but may be altered by a skilled person within the scope of the claims. An embodiment based on a proper combination of technical means disclosed in different embodiments is encompassed in the technical scope of the present invention.

The lens forming device of the present invention may be arranged such that the electric field generating means is a direct current power source for applying a direct current voltage across the mold and the substrate.

The lens forming device of the present invention may be arranged such that the electric field generating means is an alternating current power source for applying an alternating current voltage across the mold and the substrate.

A lens forming device of the present invention includes: a first mold having a first transfer surface for transferring a lens shape to a dielectric body; a second mold having a second transfer surface for transferring a lens shape to a dielectric body, the second transfer surface being positioned to face the first transfer surface; supply means for supplying the dielectric body onto the first transfer surface; transfer means for transferring the lens shape to the dielectric body by pressing the second transfer surface to the dielectric body; and curing means for curing the dielectric body to which the second transfer surface is pressed, so as to form a lens, the lens forming device further including electric field generating means for generating an electric field between the first mold and the second mold.

With the arrangement, the supply means supplies the dielectric body onto the first transfer surface of the first mold and the transfer means presses the second transfer surface of the second mold to the dielectric body thus supplied, so that the lens shape is transferred to the dielectric body. Further, the curing means cures the dielectric body, and thus a two-sided lens is formed. At that time, the electric field generating means generates an electric field between the first mold and the second mold, so that an electrostatic attraction causes the dielectric body to be attracted to the second transfer surface. The dielectric body thus attracted is shaped such that its top facing the second transfer surface has a sharp cuspate shape, so that bubbles are less likely to invade between the second transfer surface and the dielectric body when the second transfer surface is pressed to the dielectric body. This allows transferring a highly accurate lens shape to the dielectric body. Further, an electrostatic attraction generated by generation of an electric field has largest intensity at the center of the transfer surface, and accordingly the dielectric body is attracted toward the center of the transfer surface while the transfer surface is pressed to the dielectric body. Therefore, no dielectric body is attached to sides of the mold. This makes it unnecessary to carry out a process for removing a convex portion around the lens which portion would be formed when curing the dielectric body some of which attached to the sides of the mold. Consequently, it is possible to realize a lens forming device capable of forming, with high accuracy and low costs, a lens having a complicated shape.

The lens forming device of the present invention may be arranged such that the electric field generating means is a direct current power source for applying a direct current voltage across the first mold and the second mold.

The lens forming device of the present invention may be arranged such that the electric field generating means is an alternating current power source for applying an alternating current voltage across the first mold and the second mold.

A method of the present invention for forming a lens includes the steps of: (i) supplying a dielectric body onto a first transfer surface of a first mold, the first transfer surface being for transferring a lens shape to the dielectric body; (ii) transferring a lens shape to the dielectric body by pressing a second transfer surface of a second mold to the dielectric body, the second transfer surface being for transferring the lens shape to the dielectric body and being positioned to face the first transfer surface; and (iii) curing the dielectric body to which the second transfer surface is pressed, so as to form a lens, an electric field being generated between the first mold and the second mold when the second transfer surface is pressed to the dielectric body in the step (i).

With the arrangement, the dielectric body is supplied onto the first transfer surface of the first mold in the step (i), and the second transfer surface of the second mold is pressed to the dielectric body in the step (ii), so that the lens shape is transferred to the dielectric body. Further, the dielectric body is cured in the step (iii), and thus a two-sided lens is formed. In the above method, an electric field is generated between the first mold and the second mold. While an electric field is generated, an electrostatic attraction causes the dielectric body to be attracted to the second transfer surface. The dielectric body thus attracted is shaped such that its top facing the second transfer surface has a sharp cuspate shape, so that bubbles are less likely to invade between the second transfer surface and the dielectric body when the second transfer surface is pressed to the dielectric body. This allows transferring a highly accurate lens shape to the dielectric body. Consequently, it is possible to realize a lens forming method capable of forming, with high accuracy and low costs, a lens having a complicated shape.

It is preferable to arrange the method of the present invention such that an electric field, being generated between the mold and the substrate also in the step (iii).

With the arrangement, the dielectric body more closely contacts the transfer surface. This allows formation of a lens with a further higher accuracy.

INDUSTRIAL APPLICABILITY

The present invention is applicable to a technique for transferring a specific shape to a dielectric body by using a mold.

REFERENCE SIGNS LIST

1. Metal mold (mold)
1a. Transfer surface
2. Insulating substrate (substrate)
3. Stage
4. Power source (electric field generating means)
5. Switch
6. UV radiating device (curing means)
7. Dispenser (supply means)
8. Dielectric resin (dielectric body)
9. Supporter (transfer means)
11. Metal mold (mold)
11a. Transfer surface
18. Single-sided lens (lens)
21. Metal mold (mold)
21a. Transfer surface
31. Metal mold (second mold)
31a. Transfer surface (second transfer surface)
41. Metal mold (first mold)
41a. Transfer surface (first transfer surface)
100. Lens forming device
110. Lens forming device
120. Lens forming device
130. Lens forming device
140. Lens forming device

The invention claimed is:

1. A method for forming a lens, comprising the steps of:
   (i) supplying a dielectric body onto a substrate;
   (ii-1) causing a transfer surface of a mold to approach the dielectric body, the transfer surface having a concave portion or a convex portion in an aspherical shape for transferring an aspheric lens shape to the dielectric body;
   (ii-2) transferring the aspheric lens shape to the dielectric body by pressing the transfer surface to the dielectric body; and
   (iii) curing the dielectric body to which the transfer surface is pressed, so as to form a lens,
   an electric field being generated between the transfer surface of the mold and the substrate before any physical contact occurs between the transfer surface of the mold and the dielectric body in the steps (ii-1) and (ii-2), and
   in the step (ii-1), the dielectric body being attracted toward the transfer by the electric field.

2. A method for forming a lens, comprising the steps of:
   (i) supplying a dielectric body onto a first transfer surface of a first mold, the first transfer surface being for transferring a lens shape to the dielectric body;
   (ii-1) causing a second transfer surface of a second mold to approach the dielectric body, the second transfer surface having a concave portion or a convex portion in an aspherical shape for transferring an aspheric lens shape to the dielectric body and being positioned to face the first transfer surface;
   (ii-2) transferring the aspheric lens shape to the dielectric body by pressing the second transfer surface to the dielectric body; and
   (iii) curing the dielectric body to which the second transfer surface is pressed, so as to form a lens,
   an electric field being generated between the first transfer surface of the first mold and the second transfer surface of the second mold before any physical contact occurs between the dielectric body and the second transfer surface of the second mold in the steps (ii-1) and (ii-2), and
   in the step (ii-1), the dielectric body being attracted toward the second transfer surface by the electric field.

3. The method as set forth in claim 1, wherein an electric field being generated between the mold and the substrate also in the step (iii).

4. The method as set forth in claim 2, wherein an electric field being generated between the mold and the substrate also in the step (iii).

* * * * *